United States Patent [19]

Clack

[11] Patent Number: 4,997,553

[45] Date of Patent: Mar. 5, 1991

[54] STORAGE AND DISPENSING APPARATUS FOR REVERSE OSMOSIS FILTRATION PURIFICATION SYSTEM

[75] Inventor: Robert A. Clack, Madison, Wis.

[73] Assignee: Clack Corporation, Windsor, Wis.

[21] Appl. No.: 493,993

[22] Filed: Mar. 15, 1990

[51] Int. Cl.$^5$ .................... B01D 61/08; B01D 61/12
[52] U.S. Cl. ................................. 210/97; 210/257.2; 210/321.65
[58] Field of Search ............... 210/97, 99, 100, 101, 210/104.13, 195.2, 257.2, 321.6, 321.65, 321.72, 117, 136

[56] References Cited

U.S. PATENT DOCUMENTS 4,834,873 5/1989 Burrows ........................ 210/257.2
4,909,934 3/1990 Brown et al. .................. 210/257.2

Primary Examiner—Frank Sever
Attorney, Agent, or Firm—Lockwood, Alex, FitzGibbon & Cummings

[57] ABSTRACT

A new and improved reverse osmosis (R.O.) water filtration purification apparatus is described including a three-way faucet and a low cost blow molded storage tank. The storage tank includes a bladder which defines an outer drive fluid chamber and an inner purified water chamber for expandably receiving and storing purified water from an R.O. filter purification subassembly. The three-way faucet includes an actuator for simultaneously opening a pair of mechanical valves within the faucet. Simultaneously opening the faucet valves causes incoming tap water at line pressure to enter the drive fluid chamber of the tank which dispenses purified R.O. water from the purified water chamber at line pressure from the faucet. In accordance with the arrangement, a buildup of pressure on the storage tank is avoided so that a less expensive blow molded storage tank container may be employed to significantly reduce the overall cost of the apparatus. In a preferred embodiment, the storage tank is blow molded polypropylene or injection blow molded polyethylene terephthalate (PET).

20 Claims, 2 Drawing Sheets

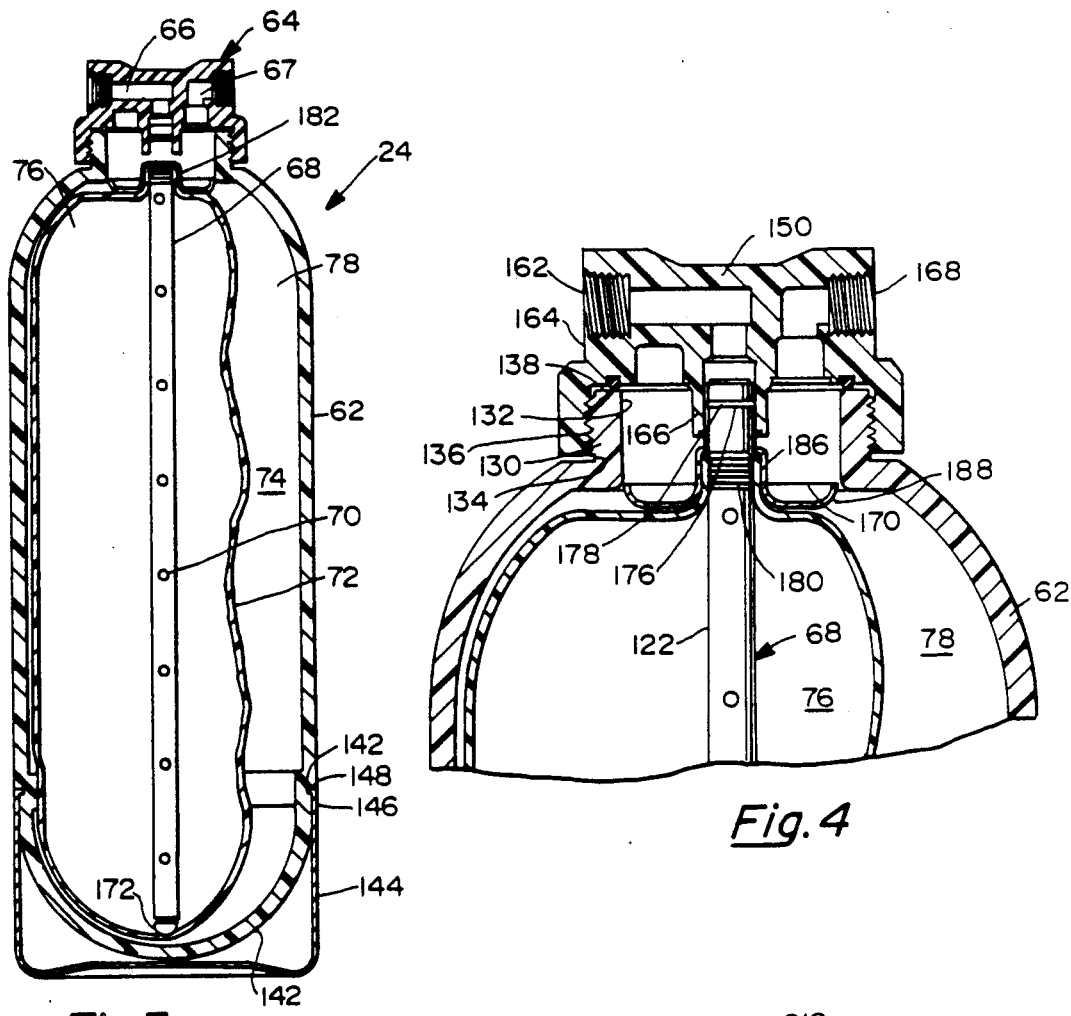
Fig.3
Fig.4
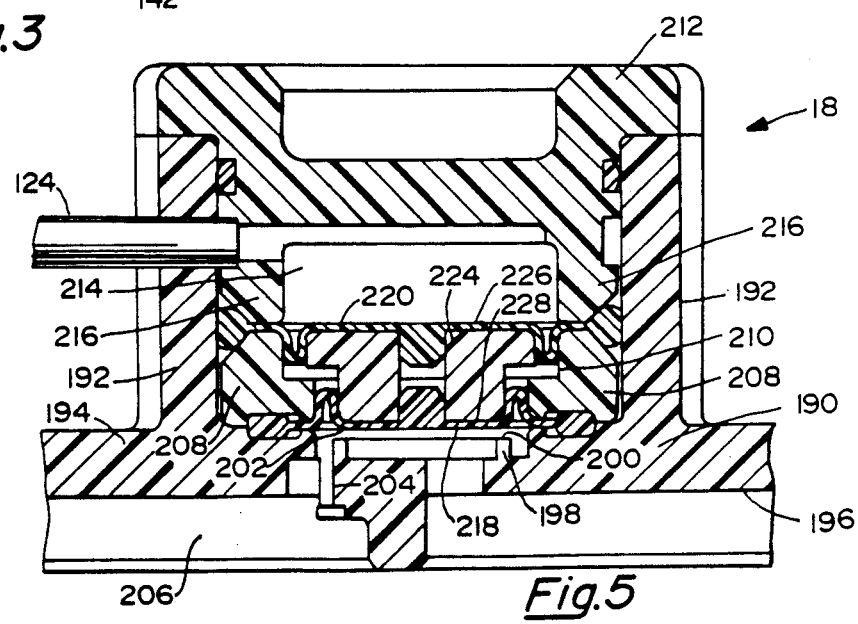
Fig.5

STORAGE AND DISPENSING APPARATUS FOR REVERSE OSMOSIS FILTRATION PURIFICATION SYSTEM

BACKGROUND OF THE INVENTION

The present invention relates to a new and improved reverse osmosis filtration purification system for drinking water intended primarily for home use. More particularly, it relates to a new and improved reverse osmosis filtration purification system incorporating a three way faucet dispense assembly and a low pressure blow-molded storage tank assembly employing tap water at line pressure as the drive fluid for dispensing purified R.O. water at line pressure to the point of use.

Many different kinds of reverse osmosis drinking water purification systems are known and commercially available. The systems have been developed for use in the home and are generally configured to be installed within an under sink compartment in the kitchen. A separate pure water dispensing faucet outlet is provided next to the regular tap water faucet of kitchen sink.

The reverse osmosis systems rely primarily on a reverse osmosis membrane filter to remove dissolved solids from incoming tap water to improve the purity of the water. Reverse osmosis systems work best at removing divalent ions from the water which may provide an unpleasant taste or cause undesirable scaling. For example, R.O. filtration purified water having lower dissolved solids content is particularly desired for drinking water, for watering plants, as a purified water feed for ice makers and to provide reduced salt containing waters for irons, humidifiers and other appliances susceptible to scaling. Moreover, in addition to the reverse osmosis membrane filter modules, other filter modules are commercially available such as granular activated carbon as well as more specialized filter modules for removing specific impurities such as iron and nitrates as well as sediments and even microbes. These additional filters may be connected in series with the R.O. filter module to provide a desired level of product water purity. These additional filters are useful for removing chlorine and other halides which impart an unpleasant taste to drinking water.

The reverse osmosis filter receives impure tap water at line pressure. The R.O. membrane divides the incoming tap water stream into a stream of purified R.O. water, containing reduced dissolved solids content and a stream of concentrate or waste water having a higher level of dissolved solids. In a conventional R.O. system, the purified water is directed to a storage container for collection and for dispensing to a point of use faucet.

In the past, specialized storage tanks capable of withstanding significantly elevated pressures were employed as the storage tanks for an R.O. system. Early storage tank embodiments included an inflatable bladder defining a pure water chamber into which pure water exiting from the R.O. system was directed. The remainder of the inner space of the high pressure tank containers could be filled with a drive fluid such as compressed air. As incoming purified water gradually filled the inflatable bladder within the storage container, the compressed air was pressurized to higher and higher pressure. Thereafter, when the dispensing faucet was opened to withdraw pure water from the storage tank, the high pressure of the compressed air in the tank would drive the pure water out of the storage tank. A major problem with these compressed air drive fluid storage tanks is that, as a significant quantity of purified water is withdrawn from inside the bladder, the pushing pressure of the compressed air against the bladder gradually decreases. This results in low pressure flow at the faucet as the tank is emptied, often only an annoying trickle. An illustrative example of a compressed air storage tank assembly for an R.O. system as shown in U.S. Pat. No. 3,719,593.

A system which describes using incoming tap water as a drive fluid for driving out the purified water from the storage tank is described in U.S. Pat. No. 3,794,172. In accordance with that system, a pressure container for the storage tank is used. In addition, a specialized diaphragm valve is connected to incoming tap water and the dispenser faucet. The high pressure storage tank and the diaphragm valve are relative expensive components that unnecessarily increase the expense of the overall system. Moreover, the diaphragm valve includes a plurality of input connections that are required to be made which increases the possibility for system leakage which is undesirable.

Still another R.O. filtration purification system is described in U.S. Pat. No. 4,021,343. This system employs the concentrate or waste water exiting from an R.O. filter module as the drive fluid for pushing against a bladder provided in a high pressure storage tank in order to dispense purified R.O. water at elevated pressure through a point of use faucet. This system employs an expensive high pressure container and elaborate valves with multiple connections to the R.O. unit. Utilizing the waste water from reverse osmosis filter as a dry fluid has the advantage that when the pure water spigot is turned on, a rush of incoming tap water tends to flush impurities through the reverse osmosis membrane. These systems work well in applications wherein the reverse osmosis membrane is intended for long term relatively permanent use.

More recently, there have been developed considerably less expensive reverse osmosis filter modules which are intended to be disposable. Accordingly, the need to purge impurities from the membrane is no longer as important since the disposable R.O. filters have limited use lives and are intended to be exchanged with new filters on a regular schedule. In view of the development of disposable R.O. filter modules, it is also desired to decrease the overall cost of manufacturing and using on under sink reverse osmosis filtration purification system making these purified water systems more accessible to a larger number of homes and other end use contexts such as in vending machines.

Accordingly, to overcome the shortcomings of the prior art devices, it is an object of the present invention to provide a new and improved reverse osmosis filter purification system for drinking water which is less expensive to make, install and use.

It is another object of the present invention to provide an R.O. purifier system which delivers purified R.O. water to a point of use faucet at substantially line pressure.

It is a further object of the present invention to provide an R.O. filtration purification system capable of employing an inexpensive low pressure container for storing R.O. water and for delivering same to a point of use faucet on demand.

It is still another object of the present invention to provide a new and improved R.O. filtration purification system including a minimum of connections between subassemblies and components to minimize the risk of leakage.

SUMMARY OF THE INVENTION

In accordance with these and other objects, the present invention provides a new and improved reverse osmosis water filtration system comprising, in combination: a pure water dispenser assembly including three-way faucet having first and second simultaneously actuated mechanical valves. A pure water faucet outlet is connected to the first mechanical valve. An actuator is provided for simultaneously mechanically actuating the first and second mechanical valves from a normally closed position to an open position. The system includes a filter assembly including at least one reverse osmosis filter module having an impure tap water inlet, a purified water outlet and a waste water outlet.

The new and improved filtration purification system of the invention also includes a new and improved storage tank assembly including a hollow blow molded thermoplastic tank body and a matable cap assembly adapted to be sealingly engaged onto the tank body. The cap assembly includes a drive fluid channel, a pure water channel and includes means for affixing an inflatable bladder to the pure water channel within the cap member. The inflatable bladder is positioned within the chamber of the hollow storage tank body to subdivide the interior into a pure water chamber and a drive fluid chamber. The drive fluid chamber is connected through the drive fluid channel in the cap member to the second valve in the three-way faucet assembly.

In accordance with the invention, incoming tap water at line pressure is connected to the second valve of the faucet assembly which is in turn connected to the drive fluid channel of the storage container. By connecting the mechanically actuated two valve, three-way faucet to the pure water and the drive fluid channels across the storage tank, a system is provided which prevents any significant pressure buildup within the storage tank. As a result, a much simpler and less expensive storage tank may be used.

In accordance with the invention, incoming tap water at line pressure is directed through a filter assembly including at least one R.O. filter module. A pure water outlet equipped with a check valve is directed to the pure water chambers of the storage tank. Optionally, but preferably, an automatic shut-off valve can be connected to the pure water chamber of the tank and back to the impure water inlet to shut off the incoming impure tap water flow into the system when the maximum capacity of the pure water storage in the storage tank has been reached or when the pure water in the tank reaches a certain pressure. A drain restrictor positioned between entrance to the drive fluid chamber of the storage tank and the system drain permits the tap water drive fluid to flow into the storage tank at line pressure to push against the bladder to drive the purified water out of the storage tank at substantially line pressure without increasing the pressure within the tank. As incoming pure R.O. water is introduced into the bladder side of the tank, the drain restrictor permits the drive fluid to be displaced out of the tank into drain also without substantially increasing the internal pressure within the tank.

The new and improved arrangement provided by this invention deletes a number of expensive diaphragm valves previously required in the prior art systems and eliminates the various connections to them which significantly reduces the risk of leakage which may develop in use. The new and improved water purification system of this invention is adapted to employ disposable R.O. cartridges as well as a number of other filter elements which may be attached in line within the filter assembly of the system to provide the desired degree of water purity.

Other objects and advantages of the present invention will become apparent from the following Detailed Description of the invention taken in conjunction with the Drawings, in which:

BRIEF DESCRIPTION OF THE DRAWINGS

FIG. 3 is an elevated cross sectional view of the new and improved storage tank assembly of the present invention;

FIG. 4 is an enlarged fragmentary elevated cross sectional view of the cap assembly of the new and improved storage tank assembly of the invention; and FIG. 5 is an elevated cross sectional view of the automatic shut-off valve assembly for use in the new and improved R.O. system of the invention.

DETAILED DESCRIPTION OF THE PREFERRED EMBODIMENT

Figure 1:
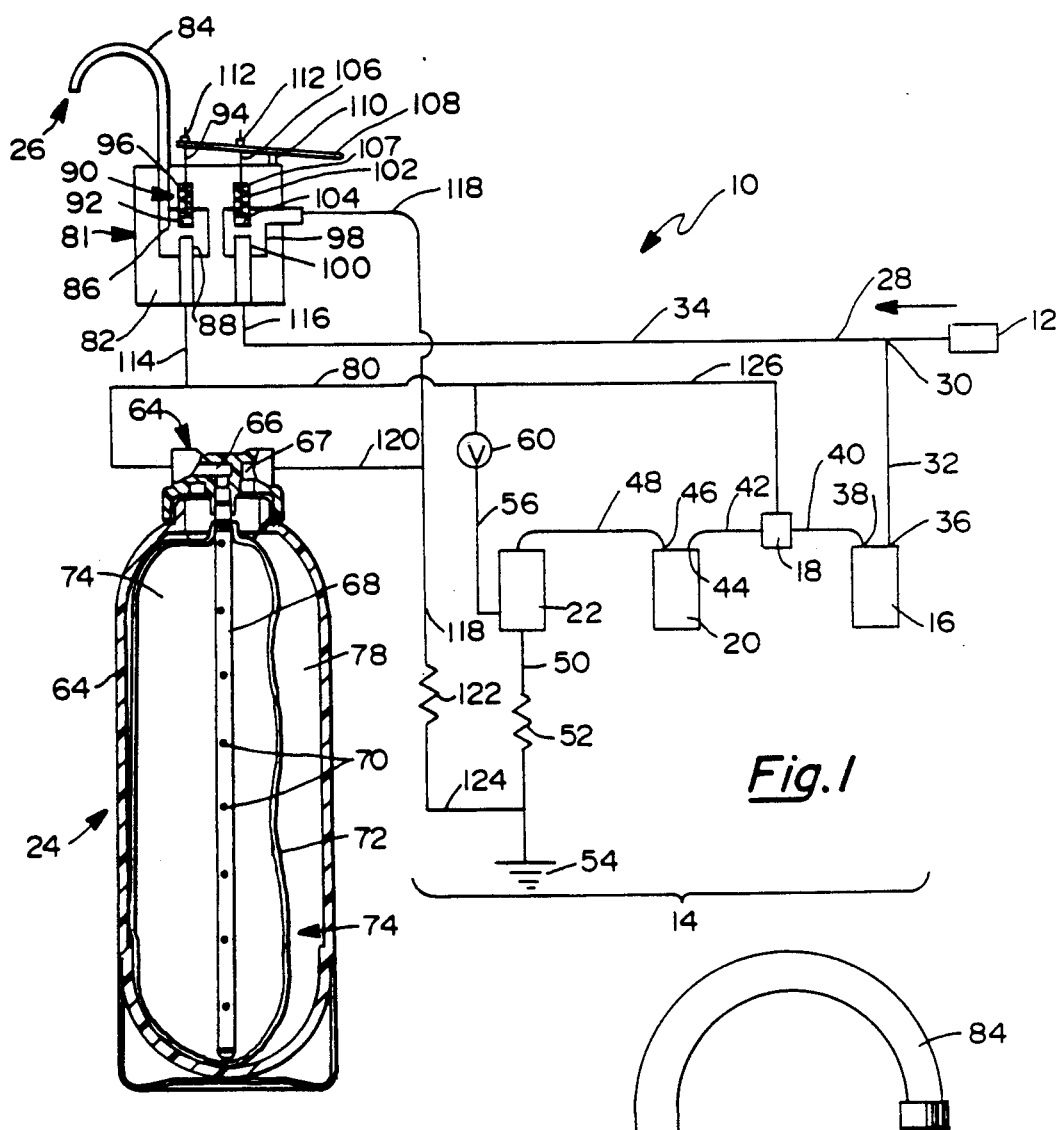
FIG. 1 is a schematic view of the new and improved reverse osmosis purification system of this invention showing the three-way faucet dispense assembly and the improved storage tank assembly.

Referring now to FIG. 1, the new and improved reverse osmosis filtration purification system, generally referred to by reference numeral 10 is shown. R.O. system 10 is connected at one end to a source of tap water 12 provided at line pressure. System 10 further includes a filtration assembly 14 including a sediment pre-filter 16, an automatic shut-off valve 18, a first granular activated carbon filter module 20 and a reverse osmosis filter module 22. R.O. system 10 is also provided with a new and improved low pressure tank assembly generally referred to by reference numeral 24. R.O. system 10 is further provided with a pure water dispense assembly indicated at 26 including a three-way, faucet assembly 81.

More particularly, an incoming impure tap water line 28 is connected to tap water source 12 and conveys tap water into the system at line pressure to a branch point 30. Incoming tap line 28 is branched at 30 into a reverse osmosis input passage 32 and a tap water drive fluid input passage 34. The reverse osmosis input passage 32 is connected to sediment filter inlet 36 on sediment pre-filter 16. Incoming tap water flows through the sediment pre-filter 16 and exits through the sediment filter outlet 38. Pre-filter 16 may be any commercially available sediment pre-filter and typically will include a carbon filter, such as granular activated carbon, for removal of chlorine and particulate solids.

An automatic shut-off valve inlet line 40 connects the sediment filter outlet 38 to the automatic shut-off valve 18. When automatic shut-off valve 18 is in its open condition, the pretreated impure tap water will be conveyed at substantially line pressure through automatic shut-off valve outlet 42 into the first filter module 20. First filter module 20 can include any of a number of available filter modules but preferably will comprise another granular activated carbon (GAC) filter for further removal of chlorine and suspended solids. Incoming water to be purified is conveyed from the automatic shut-off outlet 42 to the GAC inlet 44. After passage through the GAC first filter 20, the partially filtered tap water exits the GAC at outlet 46 and is conveyed by means of impure reverse osmosis filter inlet 48 into the reverse osmosis filter module 22.

Preferably R.O. filter 22 will be of a thin film cellulose triacetate type for significantly reducing total dissolved solids content of the impure R.O. feed water. R.O. filter module 22 will also preferably be of a disposable type. R.O. filter module 22 divides the incoming stream of impure water into purified product water which exits R.O. module 22 through product water outlet 56 and into a concentrate or waste water stream which exits R.O. module 22 through concentrate outlet 50. The waste water from the R.O. filter 22 passes through a drain restrictor 52 to system drain 54.

The R.O. purified product water passes along product water outlet passage 56 through a check valve 60 to the storage tank assembly 24.

More particularly, storage tank assembly 24 is shown to include a unitary hollow blow molded thermoplastic storage tank or body 62. A cap assembly 64 including a pure water channel 66 and a drive fluid channel 67 is threadedly engage on tank body 62. A hollow product water tube 68 is disposed within the interior of storage tank body 62. Product tube 68 includes a plurality of perforations or exit openings 70 to permit flow of purified R.O. product water into to an out of product tube 68. An inflatable plastic elastomer bladder member 72 having a bag like configuration is affixed to the upper end of the product water tube 68. The interior space 74 of storage tank body 62 is divided by the bladder member 72 in a manner defining a pure water chamber 76 disposed within the bladder 72 and a dry fluid chamber 78. A purified water line 80 connects check valve 60 with pure water channel 66 disposed within cap assembly 64.

Figure 2:
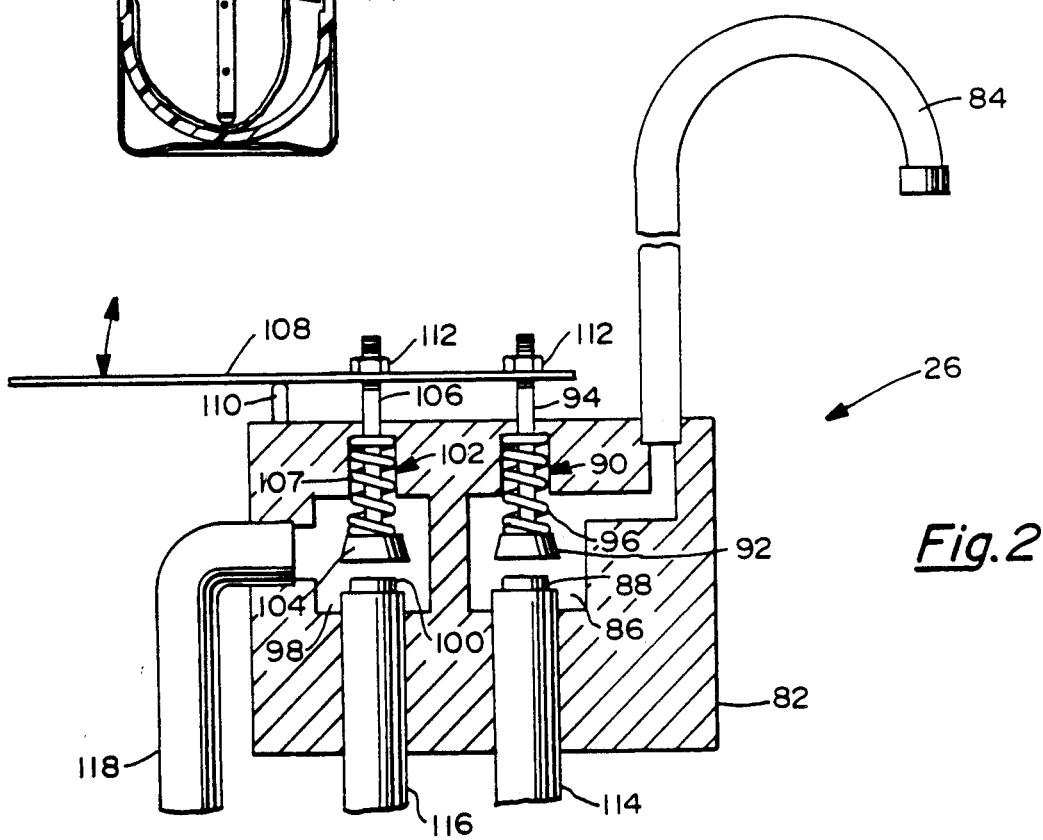
FIG. 2 is an enlarged elevated cross sectional view of the three-way faucet assembly for use in the new and improved R.O. system of the invention.

As shown in FIG. 1, the new and improved R.O. system 10 of this invention is provided with a pure water dispense assembly 26 including a three-way faucet 81. Three-way faucet 81 as shown in FIGS. 1 and 2 includes a faucet housing 82 and an elongate dispense spigot 84 extending therefrom. A first valve chamber 86 is disposed within faucet housing 82. A valve seat 88 is disposed within the first valve chamber 86 adapted to be closed by a mechanical valve means shown to include a plunger member 90 having a rubber stopper 92 affixed to the end of a valve rod 94 which is biased to a closed position against the valve seat by a coil spring 96. Faucet housing 82 also includes a second valve chamber 98 having a valve seat 100 and a plunger member 102 including a rubber stopper 104 attached to the end of a valve rod 106 biased into a closed position against valve seat 100 by means of a coil spring 107. An actuator lever arm 108 is disposed above the faucet housing 82 over the free ends of valve rods 94 and 106 as shown. Adjustment nuts 112 fit on external threads provided on the free end of valve rods 94 and 106 to secure the valve rods to the actuator lever arm. The lever arm pivots about a pivot point 110 provided on faucet housing 82. The adjustment nuts are adjusted in such manner that movement of actuator arm 108 in a clockwise direction as shown in FIG. 1 will cause a simultaneous mechanical opening of the first and second valves by moving each valve rod 94 and 106 upwardly carrying stoppers 92 and 104 upwardly and away from their respective valve seats 88 and 100. A pure water inlet 114 extends from passage 80 into the first valve chamber 86. A tap water inlet 116 extends from tap water drive passage 34 into second valve 98. A tap water drive fluid outlet 118 communicates with the second valve chamber 98 and is connected to a drive fluid passage 120 which connects tap water drive fluid outlet 118 to the drive water channel 67 provided in cap assembly 64. The continuation of drive fluid outlet 118 extends to another drain restrictor 122 and thereafter travels through a drive fluid passage 124 to drain 54.

In accordance with this invention, the operation of the system may be briefly described as follows. Incoming tap water at line pressure enters the system through tap water source 12 and incoming tap line 28. The incoming tap water passes through the sediment pre-filter 116 and then sequentially through a plurality of filters at least one of which includes a reverse osmosis filter module such as 22. R.O. module 22 divides the incoming stream into a pure water stream and a waste water stream. The waste water or concentrate stream exits the R.O. filter module through outlet 50 via the drain restrictor 52 to drain 54. The product water passes through outlet 56 and along pure water input passage 56 to 80 to the pure water channel 66 of cap assembly 64. It passes through channel 66 into the pure water tube 68 through perforations 70 and into the pure water chamber 76 defined within the bladder 72. Incoming tap water will continue to flow through the system making more and more R.O. purified water, thereby expanding the bladder 72 until it substantially fills the interior 74 of storage tank 62. In the process, drive fluid present in drive fluid chamber 78 is pushed out through drive water channel 67 in cap assembly 64 along passage 120 through drain restrictor 122 and along the drive fluid passage 124 to drain 54. Drain restrictor 122 is selected to have a resistance value which is easily overcome by the filling pressure of the pure water entering the storage tank, so that no net buildup of pressure within the tank occurs.

When purified R.O. water is desired, actuator lever arm 108 is depressed pulling upwardly on valve rods 94 and 106 causing rubber stoppers 92 and 104 to move away from their respective valve seats 88 and 100. As a result of this simultaneous mechanical opening of both valves, incoming tap water passes at line pressure along lines 28 and 34 through tap water inlet 116 to second valve 98, whereupon it is permitted to exit through tap water drive fluid outlet 118 and along passage 120 into drive fluid channel 67 provided in cap assembly 64 into chamber 78. The placement of drain restrictor 122 introduces a resistance which forces the rush of tap water to flow at substantially line pressure into the drive fluid chamber 78 provided within the storage tank body 62. Simultaneously, the first valve 86 has been opened and pure water passes out of the squeezed bladder 72 up through product tube 68 and pure water channel 66 along pure water inlet 114 into first valve 86 and out the dispense spigot 84. Because each of the valves are simultaneously actuated to their open position, flow occurs in both chambers of the storage tank and no buildup of pressure is experienced within the tank.

As shown in FIG. 1, the system optionally but preferably includes the automatic shut-off valve 18 including a pure water return pressure line 126 which connects pure water passage 80 to the automatic shut-off valve 18. Automatic shut-off valve 18 is a diaphragm valve which is responsive to an increase in pressure caused by pure water substantially filling the bladder 72 within the storage tank and which is a closed position is effective to shut off any incoming water from the sediment prefilter 16 in line 40.

When desired amount of R.O. purified water has been dispensed, actuator 108 is released. The biasing effect of coil springs 96 and 107 causes return of the actuator lever arm 108 and each of rubber stopper members 92 and 104 to their normally closed position in sealing abutting engagement against valve seats 88 and 100. Accordingly, pressure along water inlet 114 to the first valve 86 gradually increases so that incoming water from the filter assembly in line 80 will be directed into the bladder compartment 76 of the storage container 62. As the bladder 72 expands within the storage container 62, the pressure of the exiting drive fluid builds up in drive fluid outlet 118 which directs drive water to flow through drain restrictor 122 to drain.

In accordance with this invention, the three-way, two valve faucet arrangement and its appropriate connections provides a system in which the storage tank assembly 24 never experiences an elevated pressure. As a result of this configuration, an extremely inexpensive blow molded storage container may be employed. In prior art devices high pressure containers such as filament wound pressure vessels were used which considerably increased the expense of these earlier systems.

Referring now to FIGS. 3 and 4, the structural details of the new and improved storage tank assembly 24 provided by the present invention are shown. As shown in FIG. 3, the storage tank body 62 is a unitary hollow blow molded thermoplastic body having a cross sectional sidewall thickness of less than ½ inch and preferably between 1/5 and ⅛ of an inch in thickness. An upstanding peripheral lip 130 extends axially outwardly from one end of the storage tank body 62. A top opening 132 is provided which communicates with the interior volume or hollow space 74 within the tank body 62. The upstanding peripheral lip 130 includes an outer sidewall portion 134 provided with external threads 136 and includes a leading edge surface 138. The lip portion 130 of storage tank body 62 is adapted to be telescopically received within the cap assembly 64 in a manner to be described more particularly hereinafter.

The opposed lower end portion of tank body 62 includes a rounded end and a circumferential groove 142. A support boot 144 having a generally U-shaped cross sectional configuration has an upper peripheral free edge portion 146 provided with an inwardly directed flange member 148. The support boot 144 is preferably molded from a resilient thermoplastic material such as polyethylene. The support boot 144 may be affixed to the lower end of the storage tank 62 by telescopingly introducing the rounded free end 140 of the storage tank 62 into the open end of the support boot 144. This causes the free peripheral edge portions 146 with their inwardly directed flange 148 to resile outwardly until the flange 148 clears the external circumferential groove 142 provided in the lower end of the storage tank 62. Flange 148 resiliently lockingly engages the groove 142. The support boot 144 assists in maintaining the storage container 62 in a standing, upright or vertical orientation.

Also, as shown in FIG. 3, the bladder member 72 is preferably provided in the form of a bag like structure made from a thermoplastic elastomer. A preferred thermoplastic elastomer for use as the bladder member is a Saniprene material, commercially available from Monsanto, which comprises an alloyed mixture of an EPDM rubber with polypropylene. Preferably, the storage tank body is also blow molded from a polypropylene material and especially preferably is injection blow molded from polyethylene terephthalate.

The details of cap assembly 64 are more clearly depicted in FIG. 4. As shown in FIG. 4, the cap assembly 64 includes a head or body portion 150 including a depending cylindrical flange member 152 provided with internal threads 154 along a vertical sidewall surface therein. Cap body 150 includes a lower lip engaging surface 156 provided with a rectangular seal receiving groove or recess 158 adapted to receive an O-ring seal 160 for compressive sealing engagement against the leading edge surface 138 of lip 130 of the storage tank body 62.

Cap assembly 64 is adapted to have the internal threads 154 on flange 152 threadingly engage the external threads 136 provided on the outer surfaces 134 of the projecting lip 130 on storage tank body 62. Rotation of the cap head 150 causes telescoping inward engagement of the lip portion 130 within the flange portion 152 until the leading edge surface 138 on the lip 130 compresses the seal 160 carried on the cap body lower surface 156.

Also, as shown in FIG. 4, cap body 150 also includes the pure water channel 66 which includes a right angle bend extending through cap body 150. Pure water channel 66 includes a threaded opening 162 extending inwardly from a sidewall 164 of the cap body member 150 and includes a downwardly directed tubular socket 166 extending downwardly from a central portion of the body and projecting from the lip engaging surface 156 in the same direction as the outer circumferential flange 152. The cap body 150 also includes the drive fluid channel 67 provided with a threaded end portion 168 extending into an opposed portion of sidewall 164 of the cap body 150, opposite the threaded opening 162 of the pure water channel 66. Drive fluid channel 167 also includes a right angle bend and an enlarged opening section 170 extending to the lower surface 156 of the cap body 150.

As shown in FIG. 3 and 4, the product tube 68 includes an elongate tubular portion 172 provided with a plurality of perforations 70 and having a front nose rounded end portion 174 opposite the cap member 150. The opposed upper end of the product tube 68 is provided with an outer circumferential semicircular groove 176 which receives on O-ring seal 178 of circular cross sectional configuration. A ribbed section 180 is provided on the product tube 68 at a location spaced from the semicircular groove. The free end margin 182 of the bag like bladder 72 is sealingly engaged on the product tube 68 by means of a crimp seal 184 which is shown to include a crimp barrel portion 186 and a radially outwardly circumferentially extending flange portion 186. The bladder 72 is assembled to the product tube 68 by positioning the free end 182 of the bladder 72 over the ribbed portion 180 of the tube and moving the crimp seal 184 over the free end portion 182 so that the crimp barrel 186 sandwiches the free end margin 182 of the bladder against the ribbed surface 180. Thereafter, the crimp barrel 186 is circumferentially crimped causing a water tight sealing engagement between the ribbed section 180 of the product tube and the free end margin 182 of the bladder 72. The outwardly directed radially flanged portion 188 on the crimp seal 184 is provided to substantially prevent entrance of the bladder bag 72 into the top opening section within the lip projection 130 of the storage tank body 62. Sufficient clearance is provided outwardly of the flange section 188 to permit drive fluid water to pass from the drive fluid channel 67 into and out of the drive fluid chamber 78 surrounding the bladder 72.

The product tube 68 with the bladder 72 crimpingly secured and sealed thereon is inserted into the enlarged tubular socket formation 166 of the cap member 150 prior to threaded engagement of the cap member onto the storage tank body. The O-ring seal 178 disposed in the semicircular groove 176 is compressed and engaged between the sidewalls defining the tubular socket 166 and the product tube 168 to form a water tight seal therebetween. The product tube 68 keeps the bladder 72 in a correct downward position within the interior 74 of storage tank 62. It also aids in insertion of the bladder 72 through the top opening 132 of the storage tank body 62.

Referring now to FIG. 5, the automatic shut-off valve 18 for use in the new and improved R.O. filtration purification system 10 is shown. The automatic shut-off valve 18 includes a lower cylindrical housing 190 having a U-shaped cross sectional configuration depicted in FIG. 5, including a pair of upstanding wall members 192, 192 projecting upwardly from base portion 194. An inlet 196 for conveying water from the sediment filter output 40 extends within the base 194 and is upwardly directed through a cup formation 198 defining a valve seat 200 into a lower valve chamber 202. Incoming impure water is introduced into the valve chamber 202 and may exit through outlet opening 204 to an outlet passage 206 where it is conveyed by line 42 to the first filter module 20. An annular positioning ring 208 having a right angle shoulder 210 is positioned within the base valve housing 194 and a top cover member 212 is fitted through the top opening defined by the U-shaped base. Top 212 effectively defines an upper valve chamber 214 and has depending arm portions 216, 216 which compress a pair of diaphragm members including a lower diaphragm 218 and an upper diaphragm 220 against the positioning ring 208 and against the base 194. Disposed within an intermediate opening 222, of the positioning ring 208 is a generally T-shaped piston member 224 which may move upwardly or downwardly and which effectively separates the lower valve chamber 202 from the upper valve chamber 214. The piston member 224 is free to float between the flexible diaphragms 218, 220 upwardly or downwardly as shown. The area defined by the upper piston surface 226 is considerably larger than the area defined by the lower piston surface 228.

The incoming water from the sediment filter 16 at substantially line pressure fills the lower valve chamber 202 and exerts an upward force on the free floating piston member 224 which keeps the lower diaphragm 218 off the valve seat 200 permitting the pre-filter outlet water to flow through the lower valve chamber 202 through opening 204 and passage 206 to other filter modules in the filter assembly.

The upper valve chamber 214 is connected by lines 126 and 80 to the pure water chamber 76 within the storage tank 62. As purified R.O. water fills the bladder 72 and expands the volume of the pure water chamber 76 within the tank 62, the expanding bladder 72 forces the drive fluid out through the drive water outlet 67, 120, 118 and through the drain restrictor 122 to drain 54. As a result, the pressure within the storage tank 62 is desirably maintained at a very low level during expansion and filling of the bladder 72 with purified water.

When the bladder 72 becomes substantially filled within the tank 62, the pressure of the purified R.O. water will rise very quickly causing the flow of pure water along the pure water return passage 126 into the upper valve chamber 214. As the pressure of the incoming pure water in the upper valve chamber 214 increases, this pressure is exerted against the larger surface area of the upper surface 226 provides sufficient force to drive the piston 224 downwardly within the valve housing 194 so that the lower diaphragm 218 seats against the valve seat 200 to close off the incoming water inlet 196. The force exerted by a piston is directly related to the pressure on the piston times the area of the piston. By making the area of the upper piston surface 226 larger than the area of lower piston surface 228, a mechanical advantage can be provided which will shut-off the incoming water supply in line 196 when a very small pressure increase has occurred within the pure water chamber 76 in tank 62, for example, an increase less than about 5 psi.

The drain restrictor 122 positioned in the drive fluid circuit extending between the drive fluid channel 120 of the tank and the drain 54 should have a rating which exceeds preferably by a factor of 2 to 4 times the quantity of purified R.O. water expected to be produced in each day. Thus, for example, if the R.O. filter module is expected to produce a 10 gallon per day output of purified R.O. water, the drain restrictor 122 positioned in the drive fluid circuit should have a rating of between 20 and 40 gallons per day. This will provide a minimum resistance to the outflow of drive fluid from the chamber 78 as the bladder 72 is filled with purified R.O. water.

In accordance with the present invention, a dramatic reduction in the expense of providing an R.O. system is achieved. The new and improved low pressure blow molded storage tank may be made from low cost materials by a conventional blow molding method using polypropylene, or preferably by an injection blow molding method using a thermoplastic polyester, such as polyethylene terephthalate. By employing a three-way (two valve) faucet 81 which may be commercially obtained from a hardware store, the need for an additional and relatively expensive diaphragm valve with its three-way connections is avoided. A simpler more reliable mechanical valve assembly provided in the three-way faucet 81 is desirable.

The system 10 is characterized by strong delivery of pure purified R.O. water from the faucet 84, substantially at line pressure. Although additional tap water may be conveyed to drain 54 by the system 10 as compared with other earlier systems which utilized the waste from the R.O. system as the drive fluid, the cost associated with the excess tap water is the least expensive aspect of the system. By employing the three-way valve faucet and the low pressure storage tank connected in accordance with the arrangement described therein, a pressure container is no longer required which decreases the overall expense of providing a system by more than half.

Although the present invention has been described with reference to certain preferred embodiments, modifications or changes may be made by those skilled in this art. For example, the automatic shut-off valve, instead of being connected between the sediment pre- filter outlet and the storage tank outlet could instead be connected between the incoming tap water line 28 and the pure R.O. water outlet 80. Instead of including a sediment pre-filter, and a granular activated carbon first filter, other known filter modules for removing chlorine or other dissolved solids, such as iron or nitrates, or the like may be substituted. All such obvious modifications or changes may be made herein by those skilled in this art without departing from the scope and spirit of this invention as defined by the appended claims.

We claim:

1. A storage tank assembly for temporarily storing filter-purified water produced by a water filtration-purification system, said storage tank assembly comprising:

means designed for communicating with said filtration-purification system;

an elongate unitary thermoplastic hollow blow molded tank body including a continuous peripheral sidewall defining a body cavity with a top opening at one end, said tank body including an upstanding peripheral lip portion extending adjacent the periphery of said top opening and projecting axially outwardly from said one end of the tank body to a free end surface;

a cap member including a body portion having an upper surface and a lower surface and a continuous sidewall extending between said upper and lower surfaces, said cap member further including a depending flange projection extending from the periphery of said lower surface of the body portion, said flange projection and said lower surface defining a recess for telescopically receiving and matingly engaging the lip portion of the tank body to close said top opening, said cap member further including a purified water channel defined in said cap body portion extending between an opening in said lower surface and an opening in said sidewall and a drive fluid channel defined in said cap body portion extending between an opening in said lower surface and an opening in said sidewall;

a bladder sac affixed to said cap member in fluid communication with said pure water channel, said bladder being received within the body cavity of the tank member when the cap is positioned on the lip portion, said bladder being effective to subdivide the body cavity into a pure water chamber defined within the bladder and a drive fluid chamber;

means for affixing the bladder to the pure water channel of the cap member;

sealing means for sealing the cap member to the tank body; and means for maintaining the cap in mated and sealed engagement to said tank body.

2. A storage tank assembly as defined in claim 1, wherein said continuous peripheral sidewall of said tank member has a cross-sectional thickness dimension of less than about 0.5 inch.

3. A storage tank assembly as defined in claim 1, wherein said tank body comprises blow molded polypropylene.

4. A storage tank assembly as defined in claim 1, wherein said tank body comprises injection blow molded thermoplastic polyester.

5. A storage tank assembly as defined in claim 1, wherein said tank body comprises injection blow molded polyethylene terephthalate.

6. A storage tank assembly as defined in claim 1, wherein said cap member further includes a cylindrical projection depending from a central portion of said lower surface to a free end and said pure water channel extends axially through said cylindrical projection to an opening defined in the free end thereof.

7. A storage tank assembly as defined in claim 6, further comprising an elongate hollow product tube having a cap engaging end telescopically received through the pure water channel opening in the free end of the cylindrical projection into said pure water channel and sealingly engaged therein and the bladder sac being sealingly affixed to said product tube adjacent said cap engaging end so that the tube extends within the bladder sac.

8. A storage tank assembly as defined in claim 7, wherein said product tube includes a plurality of flow through apertures defined along the length thereof providing fluid communication between the pure water chamber and an inner channel defined in said hollow-product tube.

9. A storage tank assembly as defined in claim 8, wherein the bladder sac is a unitary web having an opening and a margin portion disposed adjacent said opening.

10. A storage tank assembly as defined in claim 9, wherein said bladder sac comprises a thermoplastic elastomer.

11. A storage tank assembly as defined in claim 9, wherein said means for affixing the bladder comprises a crimp seal member crimpingly and sealingly engaging the margin portion of the bladder to the product tube.

12. A storage tank assembly as defined in claim 11, wherein said crimp seal member includes an elongate generally cylindrical crimp barrel portion and a radially outwardly projecting circumferential flange projection for maintaining the bladder sac within the body cavity of the tank body away from the top opening.

13. A storage tank assembly as defined in claim 1, wherein said sealing means includes a seal-receiving radial groove defined in said lower surface of the cap body inwardly adjacent said depending flange projection, an O-ring seal positioned within said radial groove, said groove and seal being positioned for compressive sealing engagement by the free end surface of the lip portion upon mating of the cap member to the tank body.

14. A storage tank assembly as defined in claim 1, wherein said maintaining means comprises a series of external threads defined adjacent the free end surface of the lip portion on an outer surface thereof and a complementary series of internal threads defined on a surface of the flange projection within said recess, whereby said cap may be rotatably threadedly engaged onto the lip portion of said tank body.

15. A reverse osmosis water filtration purification apparatus comprising, in combination:

a filter subassembly including at least one filter module of a reverse osmosis type having an impure water inlet, a purified water outlet and a waste water outlet;

a unitary hollow thermoplastic blow molded storage tank including an interior cavity and an inflatable bladder disposed in said cavity, said bladder subdividing said cavity into a pure water chamber defined within the bladder and a drive fluid chamber;

dispenser means for dispensing purified water from the pure water chamber to a point of use, said dispenser means including a three-way faucet having first and second mechanical valve means, said first mechanical valve means including a pure water inlet and a pure water outlet, said second mechanical valve means including a drive fluid inlet and a drive fluid outlet, said three-way faucet further including actuator means for simultaneously mechanically moving said first valve means and said second valve means from a normally closed position to an open position;

first means for connecting said impure water inlet and said drive fluid inlet to a source of tap water at line pressure;

second connecting means including check valve means for connecting said purified water outlet to said pure water chamber in said storage tank;

third means for connecting said waste water outlet to a drain restrictor and from said drain restrictor to drain;

fourth means connecting said second means to said pure water inlet of said first valve disposed intermediate said pure water chamber and said check valve means;

fifth means connecting said drive fluid outlet to said drive fluid chamber; and sixth means connecting an intermediate portion of said fifth means to a drain restrictor and from said chain restrictor to drain.

16. An apparatus as defined in claim 15, wherein said filter subassembly further includes a sediment pre-filter module disposed in line in said first connector means before said impure water inlet.

17. An apparatus as defined in claim 15, further including automatic shut-off valve means for halting the incoming flow of tap water in said first means when a pre-determined pure water pressure in said pure water chamber is achieved.

18. An apparatus as defined in claim 17, wherein said storage tank includes a continuous peripheral sidewall having a cross sectional thickness dimension of less than about 0.5 inch.

19. An apparatus as defined in claim 18, wherein said storage tank comprises polypropylene.

20. An apparatus as defined in claim 18, wherein said storage tank comprises injection blow molded polyethylene terephthalate.

* * * * *